United States Patent [19]
Sato et al.

[11] Patent Number: 5,235,473
[45] Date of Patent: Aug. 10, 1993

[54] RECORDING MEDIUM ERASING DEVICE

[75] Inventors: Koichi Sato; Tahei Morisawa; Yoshio Wakui, all of Tokyo, Japan

[73] Assignee: Asahi Kogaku Kogyo Kabushiki Kaisha, Tokyo, Japan

[21] Appl. No.: 680,700

[22] Filed: Apr. 4, 1991

[30] Foreign Application Priority Data

| Apr. 13, 1990 | [JP] | Japan | 2-98537 |
| Apr. 17, 1990 | [JP] | Japan | 2-102617 |
| Apr. 17, 1990 | [JP] | Japan | 2-102618 |
| Apr. 17, 1990 | [JP] | Japan | 2-102619 |
| Apr. 17, 1990 | [JP] | Japan | 2-102620 |
| Apr. 17, 1990 | [JP] | Japan | 2-102621 |

[51] Int. Cl.$^5$ .................................................. G11B 15/46
[52] U.S. Cl. ........................................ 360/66; 360/73.03
[58] Field of Search ........................ 360/57, 66, 73.03

[56] References Cited

U.S. PATENT DOCUMENTS 3,723,668   3/1973   Ritchey, Jr. .

FOREIGN PATENT DOCUMENTS

| 59-84311 | 5/1984 | Japan . | |
| 83203 | 5/1985 | Japan | 360/57 |
| 236159 | 11/1985 | Japan | 360/57 |
| 62-85904 | 6/1987 | Japan . | |
| 8701852 | 3/1987 | World Int. Prop. O. . | |

OTHER PUBLICATIONS

Great Britain Search Report.

Primary Examiner—Paul Gensler
Attorney, Agent, or Firm—Sandler, Greenblum & Bernstein

[57] ABSTRACT

A device for erasing a signal recorded on a floppy disk during a rotation of the disk. An erasing signal used for erasing the recorded signal is generated by a frequency-modulator or a DPSK-modulator, and can be an audio FM carrier, a luminance signal "Y+S", an R−Y differential color signal, a B−Y differential color signal and a DPSK signal. These signals can be combined for use as an erasing signal.

41 Claims, 19 Drawing Sheets

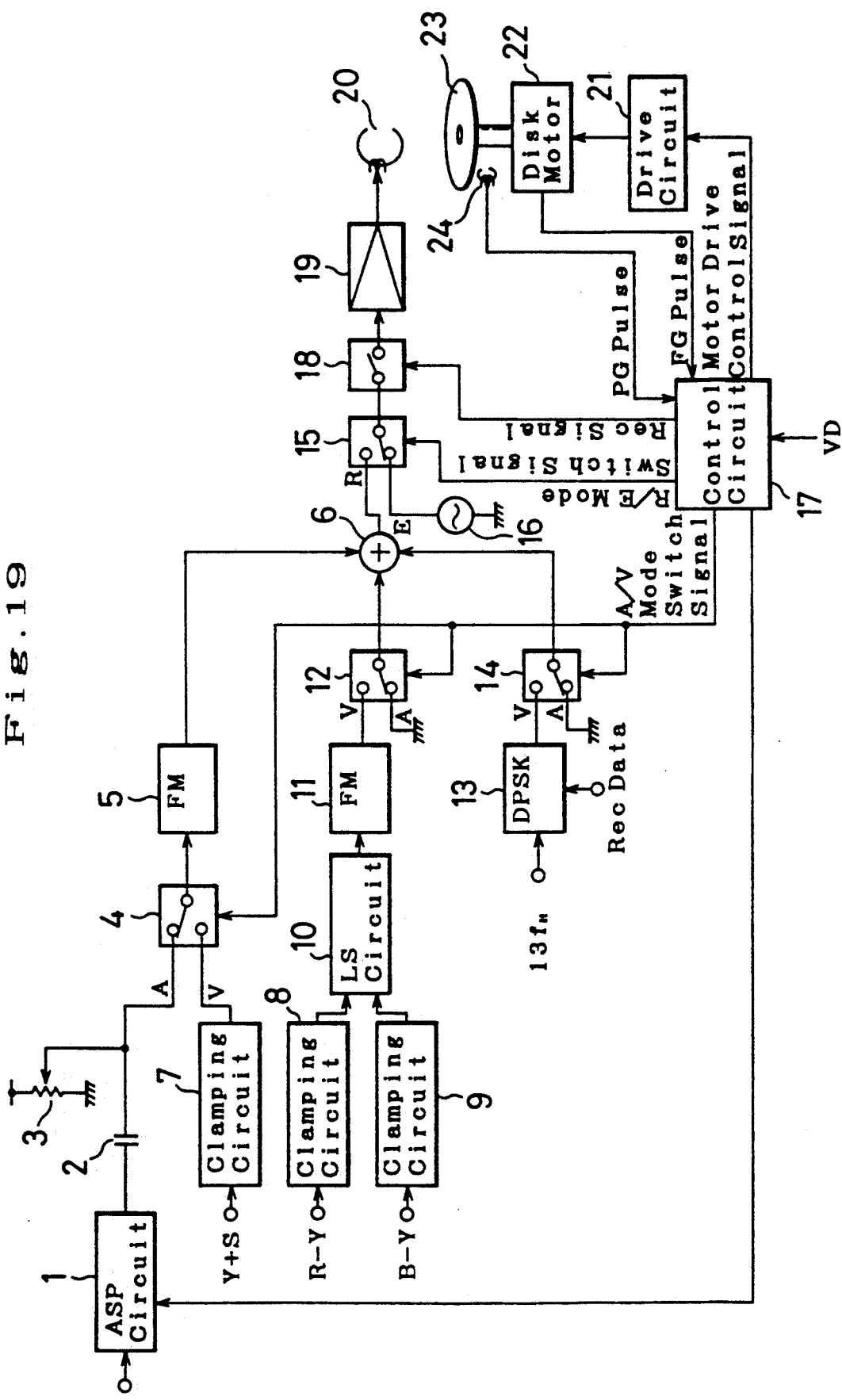

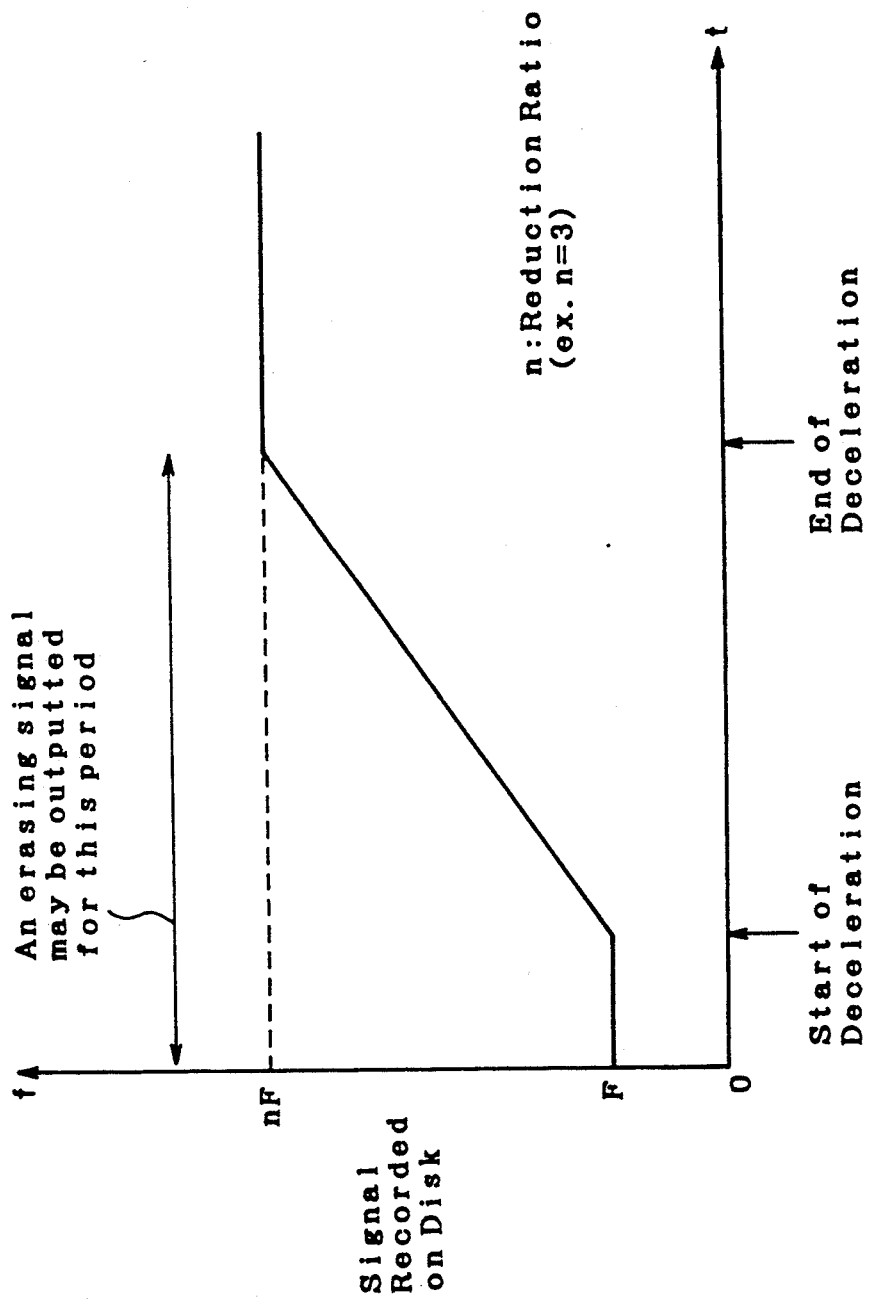

RECORDING MEDIUM ERASING DEVICE

BACKGROUND OF THE INVENTION

1. Field of the Invention

The present invention relates to a recording medium erasing device that is used, for example, for erasing a video signal or an audio signal on a video floppy disk recorded by an electronic still video camera.

2. Description of the Related Art

In an erasing mode of a conventional erasing device, a rotation speed of a disk is lowered from a standard speed (such as, for example, 3600 rpm) to approximately ⅓ of the standard speed (i.e., 1200 rpm). Then, while the disk is rotated at ⅓ of the standard speed, an erasing signal, having a frequency "f", is recorded on a video track or an audio track of the disk.

Since the rotation speed of the disk is set to ⅓ of the standard speed, if the frequency of the erasing signal recorded on the disk is converted to a frequency at the standard speed, the frequency of the erasing signal is "3f". Namely, although the frequency of the erasing signal on the erasing mode is "f", if the disk is rotated at the standard speed to reproduce the signal on the disk, the frequency of the erasing signal becomes "3f".

Therefore, if the frequency "f" is set to an appropriate value, the frequency "3f" can be set outside the FM frequency band, whereby an audio signal or a video signal recorded on the audio track or the video track is erased.

As described above, in a conventional device, since the erasing signal having a predetermined constant frequency "f" is recorded on the disk rotating at ⅓ of the standard speed, to thereby erase a recorded signal on the disk, the frequency "f" must be high enough to erase the signal. If the value of the frequency "f" is not high enough, the erasing signal is reproduced in a reproduction mode. As a result, when it is determined whether or not an RF (Radio Frequency) signal exists in a reproduced track of the disk, to determine whether the checked track is a recorded track or a non-recorded track, a non-recorded track can be mistaken for a recorded track.

Further, in a conventional device, since the erasing signal having the predetermined constant frequency "f" is generated by a generator, not only must the generator and a switch be provided, but signal lines are needed to transmit a switching signal for controlling the switch, and therefore, the conventional device has a complicated construction.

SUMMARY OF THE INVENTION

Therefore, an object of the present invention is to provide an erasing device in which a frequency of the erasing signal can be lowered.

Another object of the present invention is to provide an erasing device in which a generator, used exclusively for generating the erasing signal, need not be provided, so that the construction of the device is simplified.

According to the present invention, there is provided an erasing device comprising a rotating mechanism, a recording mechanism, a generating mechanism, a supply mechanism, and a control mechanism.

The rotating mechanism rotates a recording medium, such as a floppy disk; the recording mechanism records a signal onto the record medium; the generating mechanism generates an erasing signal, the supply mechanism supplies the erasing signal to the recording mechanism, for erasing the signal on the recording medium; and the control mechanism controls the rotating mechanism and the supply mechanism to erase the signal on the recording medium. The control mechanism controls the rotating mechanism, to gradually reduce a rotation speed of the recording medium to a predetermined speed, and controls the supply mechanism to record the erasing signal on the recording medium while the rotation speed of the recording medium is gradually reduced.

Further, according to the present invention, there is provided an erasing device comprising a rotating mechanism, a generating mechanism, a supply mechanism, and a control mechanism.

The rotating mechanism rotates a recording medium; the generating mechanism generates an erasing signal; the supply mechanism supplies the erasing signal to the recording medium for erasing the signal thereon; and the control mechanism controls the rotating mechanism and the supply mechanism to erase the signal on the recording medium. The control means controls the rotating mechanism, to gradually reduce a rotation speed of the recording medium to a predetermined speed, and controls the supply mechanism to record the erasing signal on the recording medium while the rotation speed of the recording medium is gradually reduced.

Still further, according to the present invention, there is provided an erasing device comprising a rotating mechanism, an outputting mechanism, and a control mechanism.

The rotating mechanism rotates the recording medium; the outputting mechanism outputs an erasing signal to the recording medium when erasing the signal thereon; and the control mechanism controls the rotating mechanism and the outputting mechanism when erasing the signal thereon. The control mechanism controls the rotating mechanism, to gradually reduce a rotation speed of the recording medium until the rotation of the recording medium is stopped, and controls the outputting mechanism to record the erasing signal on the recording medium at least during the period in which the recording medium is gradually decelerated.

Further, according to the present invention, there is provided a device for erasing a signal recorded on a recording medium mounted in a recording device, in which the signal is recorded on the recording medium during a rotation thereof, the erasing device comprising a rotating mechanism and an erasing mechanism.

The rotating mechanism rotates the recording medium at a predetermined rotational speed that is slower than a rotation speed used when recording the signal on the recording medium. The erasing mechanism erases the signal recorded on the recording medium. The erasing mechanism records an erasing signal on the recording medium while the rotating mechanism rotates the recording medium at the predetermined rotational speed, so that the signal recorded on the recording medium is erased. The erasing signal corresponds to an information inputted from the outside of the recording device.

Still further, according to the present invention, there is provided a device for erasing a signal recorded on a recording medium rotated by a rotation mechanism, the device including an erasing mechanism outputting an erasing signal to the recording medium when erasing the signal recorded thereon, the device being characterized in that the rotation mechanism gradually reduces a rotation speed of the recording medium to a predetermined speed, and the erasing mechanism outputs the erasing signal to the recording medium at least during a period in which the rotation speed of the recording medium is gradually reduced.

BRIEF DESCRIPTION OF THE DRAWINGS

The present invention will be better understood from the description of the preferred embodiments of the invention set forth below, together with the accompanying drawings, in which:

FIG. 19 is a circuit diagram of a tenth embodiment of an erasing device according to the present invention; and FIG. 20 is a diagram showing a change of the frequency of a signal recorded on a disk;

DESCRIPTION OF THE PREFERRED EMBODIMENTS

Figure 1:
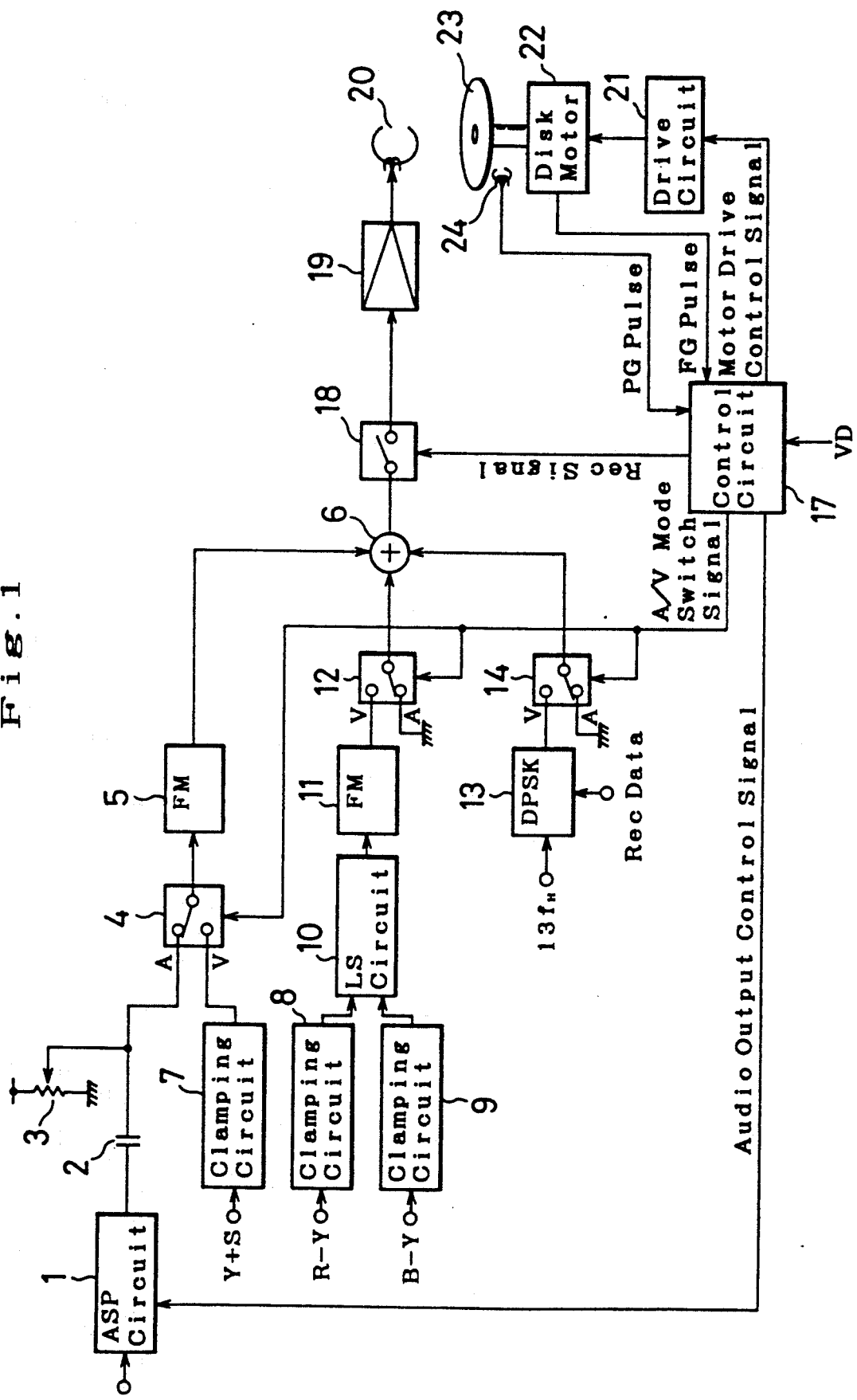
FIG. 1 is a circuit diagram of a first embodiment of an erasing device according to the present invention.

The present invention will now be described with reference to various embodiments shown in the drawings.

FIG. 1 shows a first embodiment of an erasing device according to the present invention.

In this embodiment, a disk 23 is used as a recording medium. A control circuit 17, for example, a microcomputer, controls each component of this erasing device. When a command for recording a video signal to the disk 23 is inputted to the control circuit 17, the control circuit 17 turns ON switches 4, 12 and 14, to close contacts V, respectively, and closes switch 18.

Figure 2:
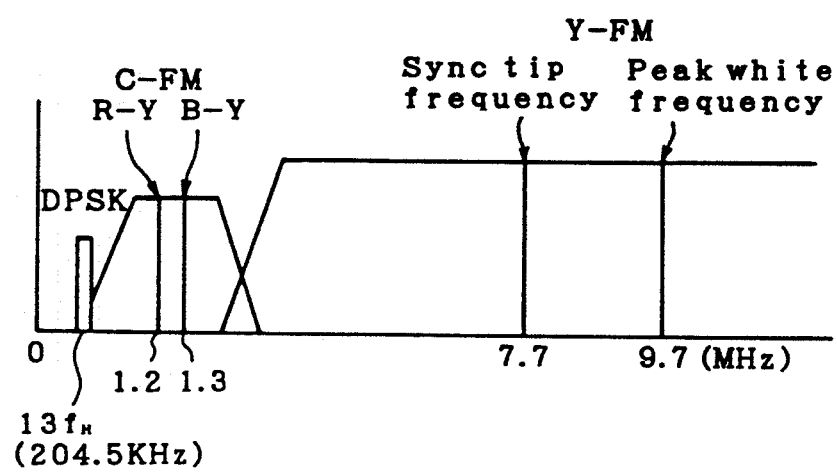
FIG. 2 is a diagram showing a frequency spectrum of a video signal.

A luminance signal "Y+S", which includes a synchronizing signal "S", is clamped at a predetermined level by a clamping circuit 7, and then inputted to a frequency-modulator 5 through the switch 4. The frequency-modulator 5 frequency-modulates a predetermined carrier with the luminance signal, and outputs the frequency-modulated signal to an adder 6. At this time, the luminance signal is frequency-modulated so that a sync tip frequency and a peak white frequency become 7.7 MHz and 9.7 MHz, respectively, as shown in FIG. 2.

An R−Y differential color signal and a B−Y differential color signal are clamped by clamping circuits 8 and 9, respectively, and then inputted to a line sequentializing circuit 10, which line-sequentializes the R−Y and B−Y differential color signals and outputs them to a frequency-modulator 11. As shown in FIG. 2, the R−Y and B−Y differential color signals are frequency-modulated with carriers having 1.2 MHz and 1.3 MHz frequencies, respectively, by the frequency-modulator 11, and inputted to the adder 6 through the switch 12.

Note that the luminance signal "Y+S", the R−Y differential color signal, and the B−Y differential color signal are supplied by a known image signal processing circuit (not shown), which outputs these signals in accordance with a video signal inputted from an imaging device such as a CCD, or an outside device.

A DPSK (differential phase shift keying) modulator 13 DPSK-modulates a carrier having a frequency 13 fH (=204.75 KHz) (fH is a frequency of a horizontal synchronization signal) with a predetermined code signal, and supplies the DPSK-modulated signal to the adder 6 through the switch 14.

Accordingly, video signals (composite signals composed of the luminance signal "Y+S", the R−Y differential color signal, the B−Y differential color signal, and the DPSK signal), which are frequency-multiplied, as shown in FIG. 2, are inputted by the adder 6 to an amplifier 19, through a switch 18, to be amplified and then supplied to a head 20.

A motor drive circuit 21 is controlled by the control circuit 17 to drive a disk motor 22, which rotates disk 23.

The disk motor 22 generates an FG pulse that corresponds to a rotation speed of the disk 23, and outputs the FG pulse to the control circuit 17. A sensor 24, such as, for example, a Hall element, generates a PG pulse that corresponds to a rotational position of the disk 23, and outputs the PG pulse to the control circuit 17. The control circuit 17 compares the FG pulse and the PG pulse with base signals, to obtain error signals denoting the differences between the pulse and the base signals, respectively, and controls the motor drive circuit 21 in accordance with the error signals, so that the disk 23 is controlled to rotate at a predetermined speed. Thus, video signals are recorded on a predetermined track of the disk 23.

Figure 3:
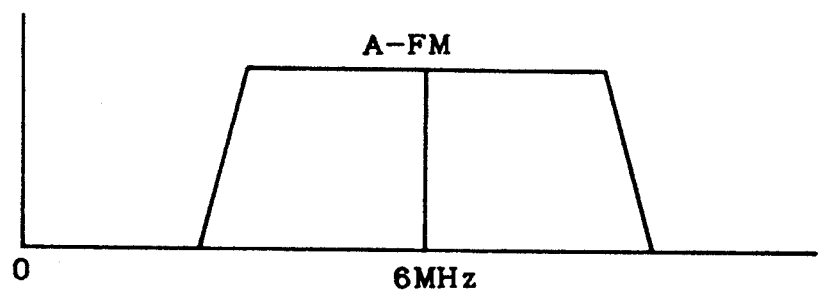
FIG. 3 is a diagram showing a frequency spectrum of an audio signal.

On the other hand, when a command for recording an audio signal to the disk is inputted to the control circuit 17, the control circuit 17 turns ON switches 4, 12 and 14 to close contacts A, respectively. An audio signal processing circuit 1 processes the audio signal inputted thereto, and supplies the processed signal to the frequency-modulator 5 through a capacitor 2, which removes a direct current, and the switch 4. The frequency-modulator 5 frequency-modulates a carrier having a 6 MHz frequency with the inputted audio signal, and outputs the frequency-modulated signal to the adder 6, as shown in FIG. 3.

The direct current level of the audio signal inputted to the frequency-modulator 5 is set to a predetermined value by adjusting a resistance value of a variable resistance 3, so that a central frequency (6 MHz) of the frequency-modulated audio signal is set.

The audio signal outputted from the adder 6 is inputted to the amplifier 19 through switch 18 to be amplified, and then supplied to the head 20, so that the audio signal is recorded on a predetermined track of the disk 23.

Figure 4:
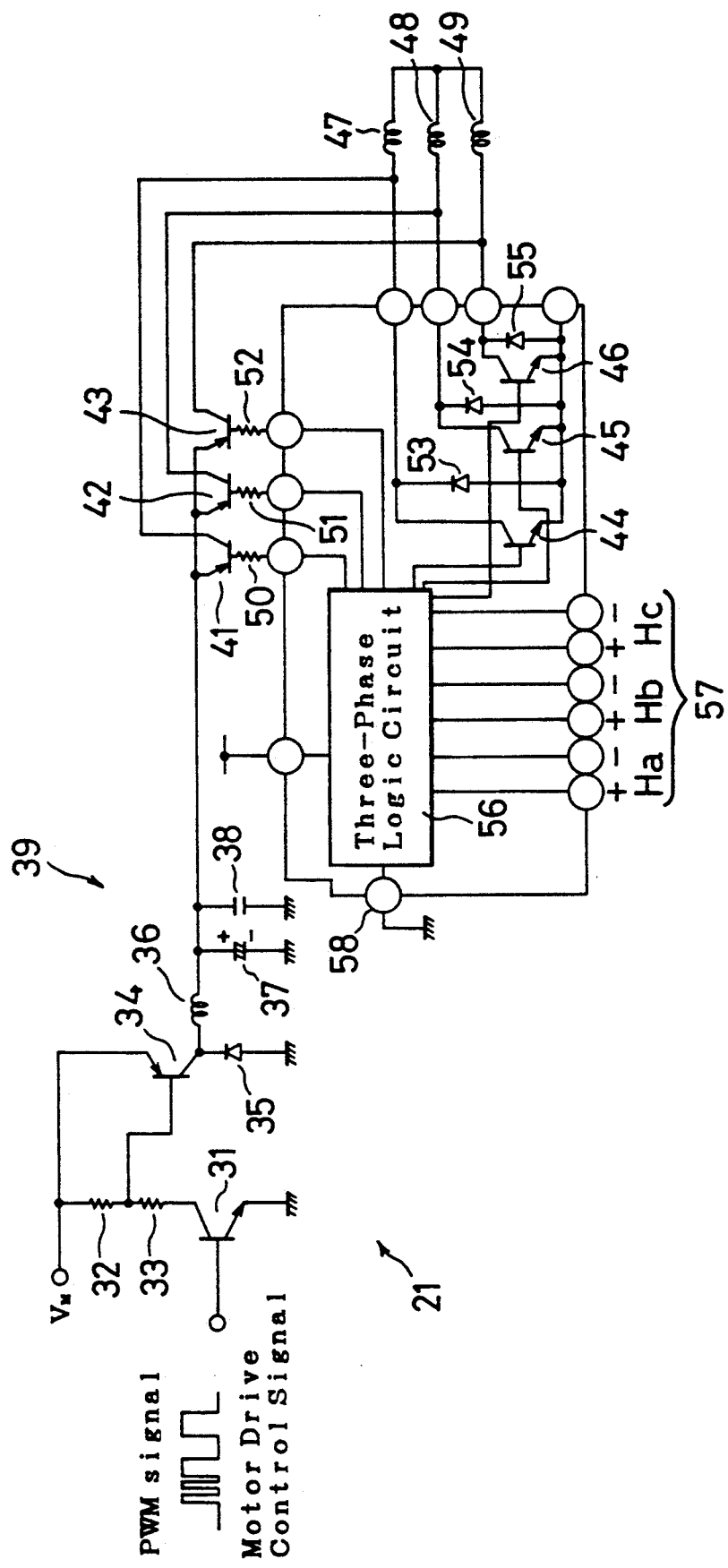
FIG. 4 is a circuit diagram of a motor drive circuit.

FIG. 4 shows a circuit diagram of the motor drive circuit 21.

In this embodiment, an NPN transistor 31, a PNP transistor 34, resistors 32 and 33, a diode 35, a coil 36, and capacitors 37 and 38 comprise a switching regulator circuit. When a PWM (pulse width modulation) signal, i.e. a motor drive control signal, is inputted from the control circuit 17 to a base of the NPN transistor 31, the NPN transistor 31 and PNP transistor 34 are turned ON and OFF in accordance with the PWM signal. Accordingly, a voltage VM is repeatedly supplied and cut off. This intermittent signal is smoothed by the capacitors 37 and 38, and outputted as a drive signal that corresponds to the PWM signal.

A three-phase logic circuit 56, in accordance with three-phase position signals Ha, Hb and Hc inputted through terminals 57, sequentially turns ON and OFF one of a plurality of PNP transistors 41 through 43 and one of a plurality of NPN transistors 44 through 46, at a predetermined timing. Accordingly, an electric current IL having a predetermined phase is supplied to coils 47 through 49 constructing the disk motor 22. Thus, the disk motor 22 rotates at a speed corresponding to the PWM signal. The direction of rotation of the disk motor 22 can be selected by grounding or opening a terminal 58.

Note that resistances 50 through 52 are base resistors of the PNP transistors 41 through 43, and diodes 53 through 55 are protection diodes connected to the NPN transistors 44 through 46 to protect them against reverse voltages.

Figure 5:
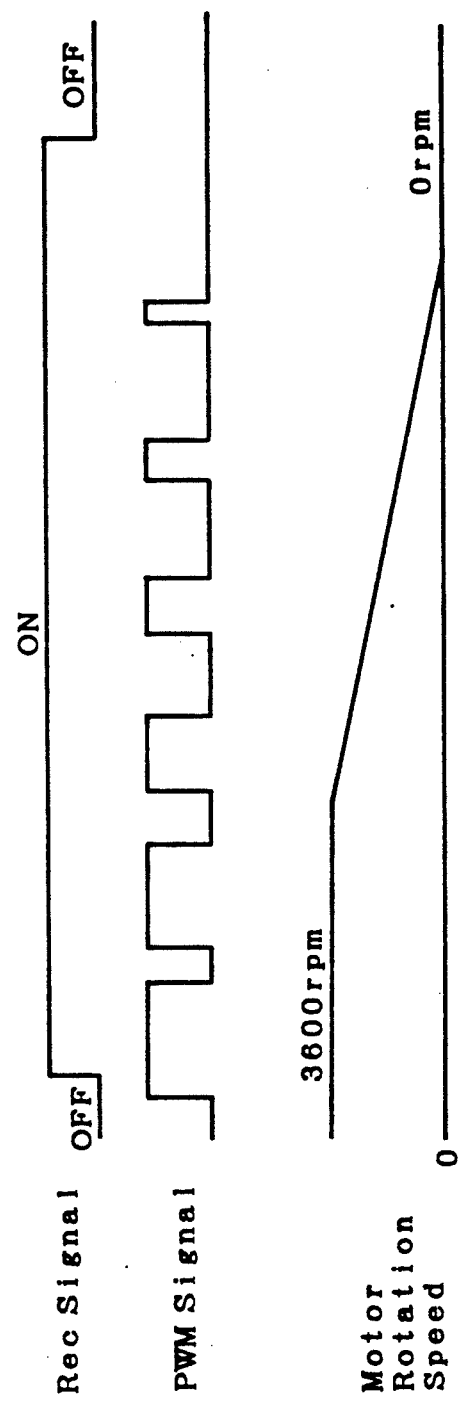
FIG. 5 is a timing chart showing a lowering of the motor rotation speed in the first embodiment.

When a command for erasing signals recorded on the disk 23 is inputted to the control circuit 17 (an erasing mode), as shown in FIG. 5, a pulse width of the PWM signal outputted to the motor drive circuit 21 is gradually decreased, whereby a rotation speed of the disk motor 22 is gradually reduced from a standard speed of 3600 rpm to 0 rpm (i.e., the disk motor is stopped). At this time, the control circuit 17 outputs a record signal to switch 18, so that switch 18 is turned ON for a predetermined time during the period in which the rotation speed of the disk 23 is gradually reduced until the rotation of the disk 23 is finally stopped.

Figure 6:
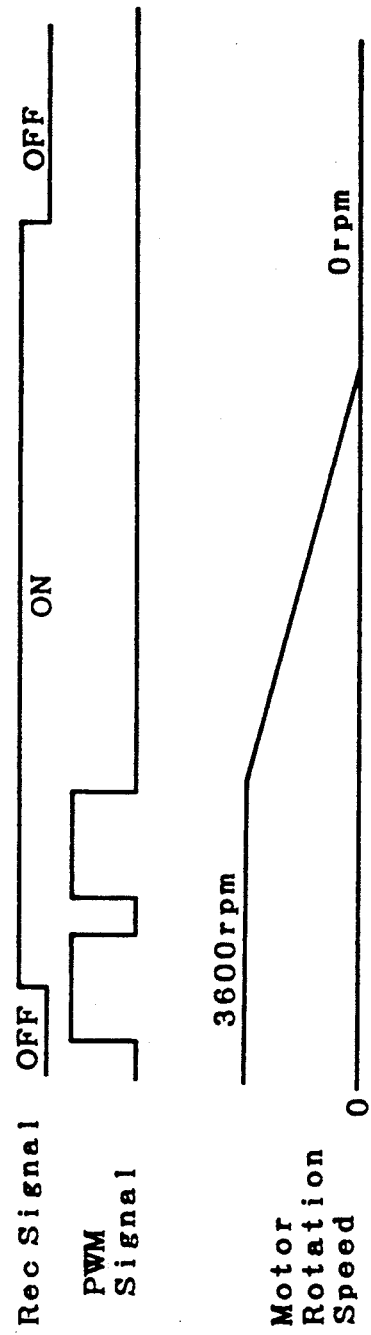
FIG. 6 is a timing chart showing another example of a lowering of the motor rotation speed.

Alternatively, the control circuit 17 may stop an output of the PWM signal to the motor drive circuit 21, as shown in FIG. 6. As a result, a rotation speed of the disk motor 22 is gradually reduced and is stopped. In this case also, switch 18 is turned ON until the rotation of the disk 23 is completely stopped.

Figure 7:
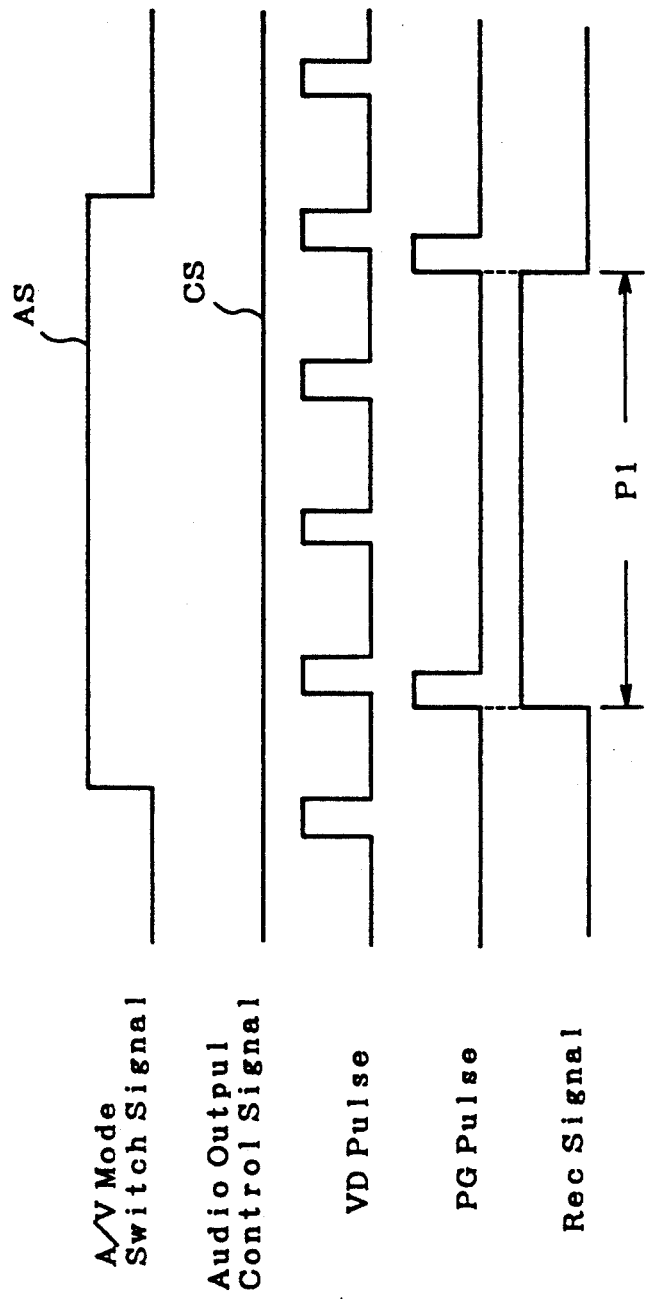
FIG. 7 is a timing chart showing each pulse signal.

On the other hand, as shown in FIG. 7, a VD pulse, corresponding to a vertical synchronizing signal, and a PG pulse are inputted to the control circuit 17. Thus, the control circuit 17 sets a period P1 for turning ON switch 18 to a period in which the sensor 24 outputs at least two PG pulses, i.e., a period in which the disk 23 is rotated by at least one revolution (in this embodiment, the disk 23 is rotated by one revolution for 3 fields). Thereafter, the control circuit 17 outputs an audio mode signal AS, to switch switches 4, 12 and 14 to contacts A, respectively, for at least the time for which switch 18 is turned ON (the period P1). Note that the VD pulse is outputted to the control circuit 17 by a base pulse generating circuit (not shown).

At this time, since the control circuit 17 does not output a control signal CS to the audio signal processing circuit 1, the frequency-modulator 5 outputs only a carrier for frequency-modulation, as an erasing signal. The contacts A of switches 12 and 14 are grounded. Therefore, adder 6 outputs the audio frequency-modulation (FM) carrier inputted from the frequency-modulator 5 as it is, and this audio FM carrier is recorded on a video track, or an audio track, by the head 20, as an erasing signal.

Figure 8:
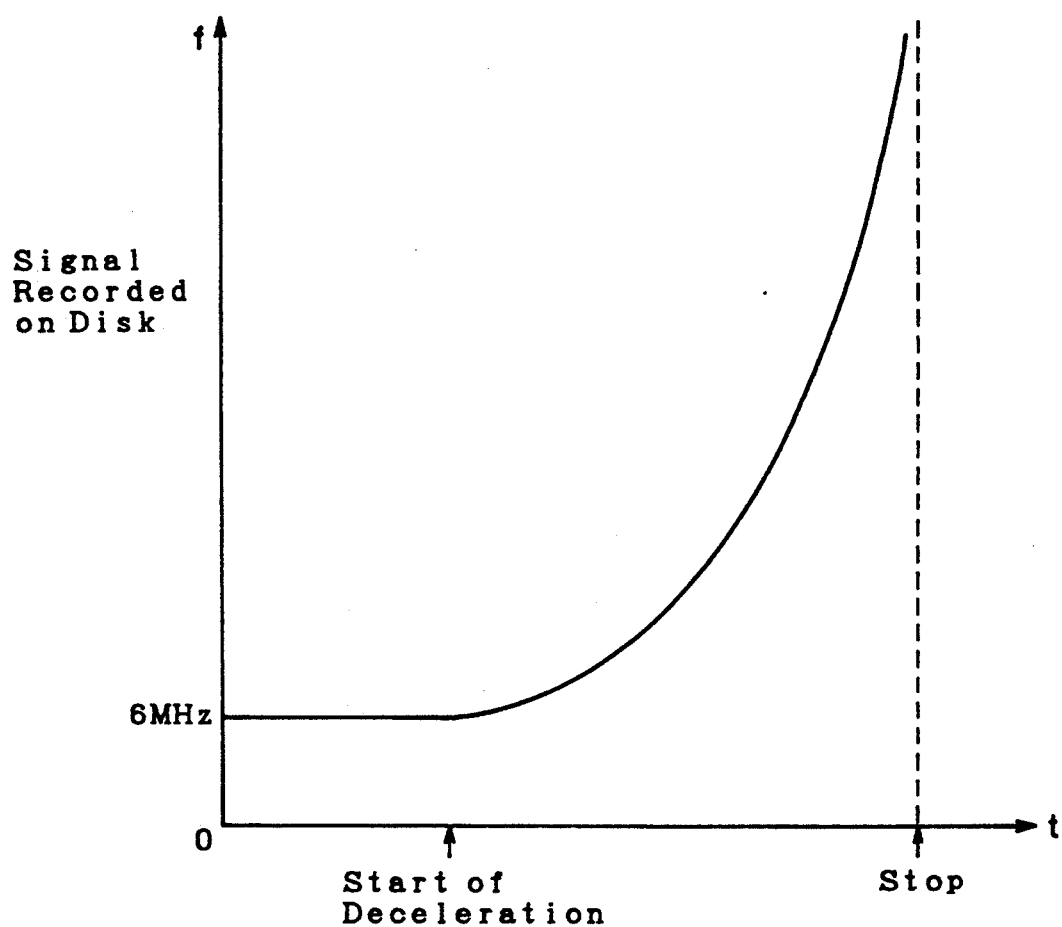
FIG. 8 is a diagram showing a change of the frequency of a signal recorded on a disk.

Although the frequency of the audio FM carrier is 6 MHz, since this FM carrier is recorded on the disk 23 until just before the disk 23 is stopped, as shown in FIG. 8, the frequency is theoretically infinite if the rotation speed of the disk 23 is changed to the standard speed.

Figure 9:
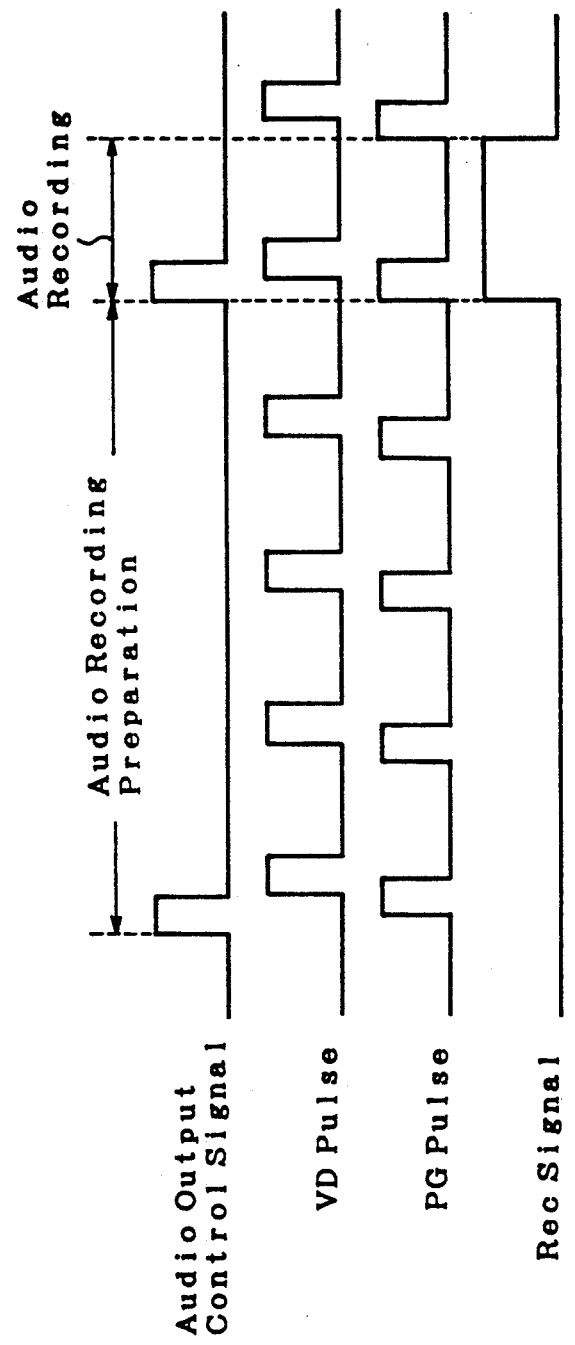
FIG. 9 is a timing chart showing each pulse signal when recording an audio signal on a disk.

For comparison, a usual recording timing for an audio signal is described below, with reference to FIG. 9. In this case, since the disk 23 is rotated at the standard speed of 3600 rpm, the VD pulse and the PG pulse are synchronized with each other. The control circuit 17 outputs a control signal to the audio signal processing circuit 1, so that an audio signal in a predetermined period is time-compressed and stored in a memory (not shown) in the control circuit 17. The audio signal stored in the memory is read from the memory when the disk 23 is rotated by one revolution in synchronization with the PG pulse, and recorded on a predetermined track on the disk 23, as shown in FIG. 9.

Figure 10:
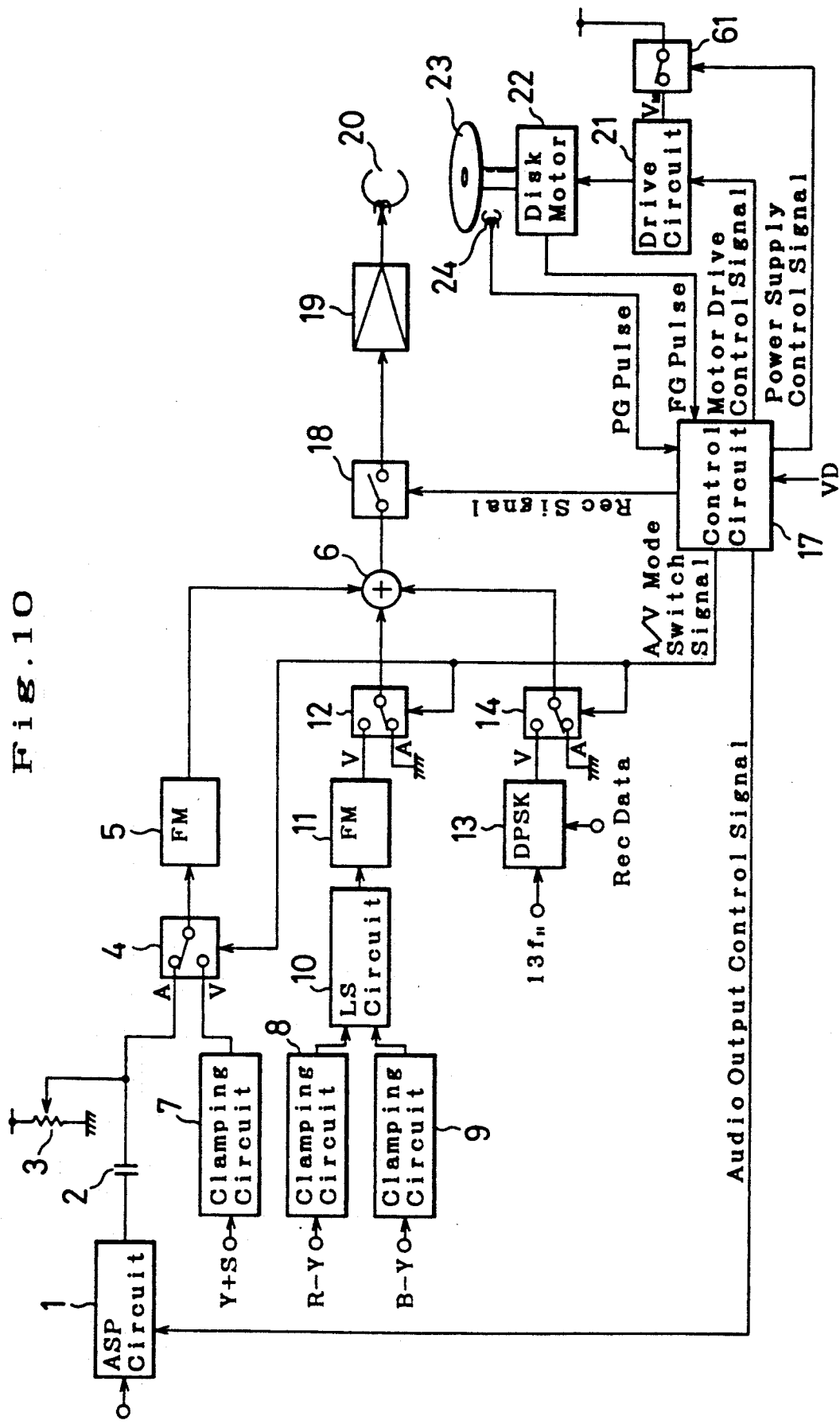
FIG. 10 is a circuit diagram of a second embodiment of an erasing device according to the present invention.

FIG. 10 shows a second embodiment of an erasing device according to the present invention. In this drawing, parts corresponding to those of the first embodiment are shown by the same reference numeral as in FIG. 1. This also applies to the embodiments described later.

In the second embodiment, a switch 61 for controlling a supply of a voltage VM to the motor drive circuit 21 is provided. The remaining construction is the same as shown in FIG. 1.

Figure 11:
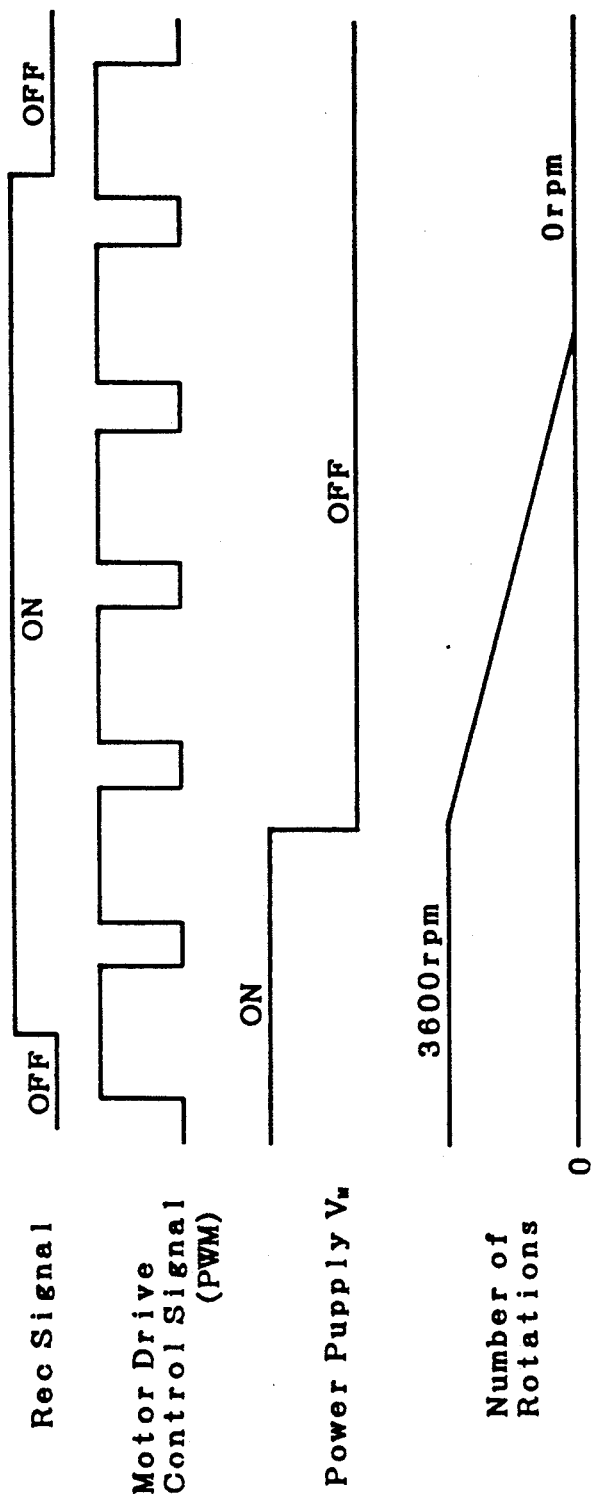
FIG. 11 is a timing chart showing a lowering of the motor rotation speed in the second embodiment.

In this embodiment, the control circuit 17 turns switch 61 OFF in the erasing mode, whereby a supply of the voltage VM to the motor drive circuit 21 is stopped, as shown in FIG. 11. Accordingly, even if the PWM signal is still supplied to the drive circuit 21, a rotation speed of the disk motor 22 is gradually lowered and finally stopped, as shown in FIG. 11. Also, in this case, switch 18 is turned ON, for at least a time during the period in which a rotation speed of the disk 23 is decreased and finally stopped, as shown by the recording signal in FIG. 11.

As a result, similar to the first embodiment shown in FIG. 1, the audio FM carrier is recorded on the disk 23 as an erasing signal.

Figure 12:
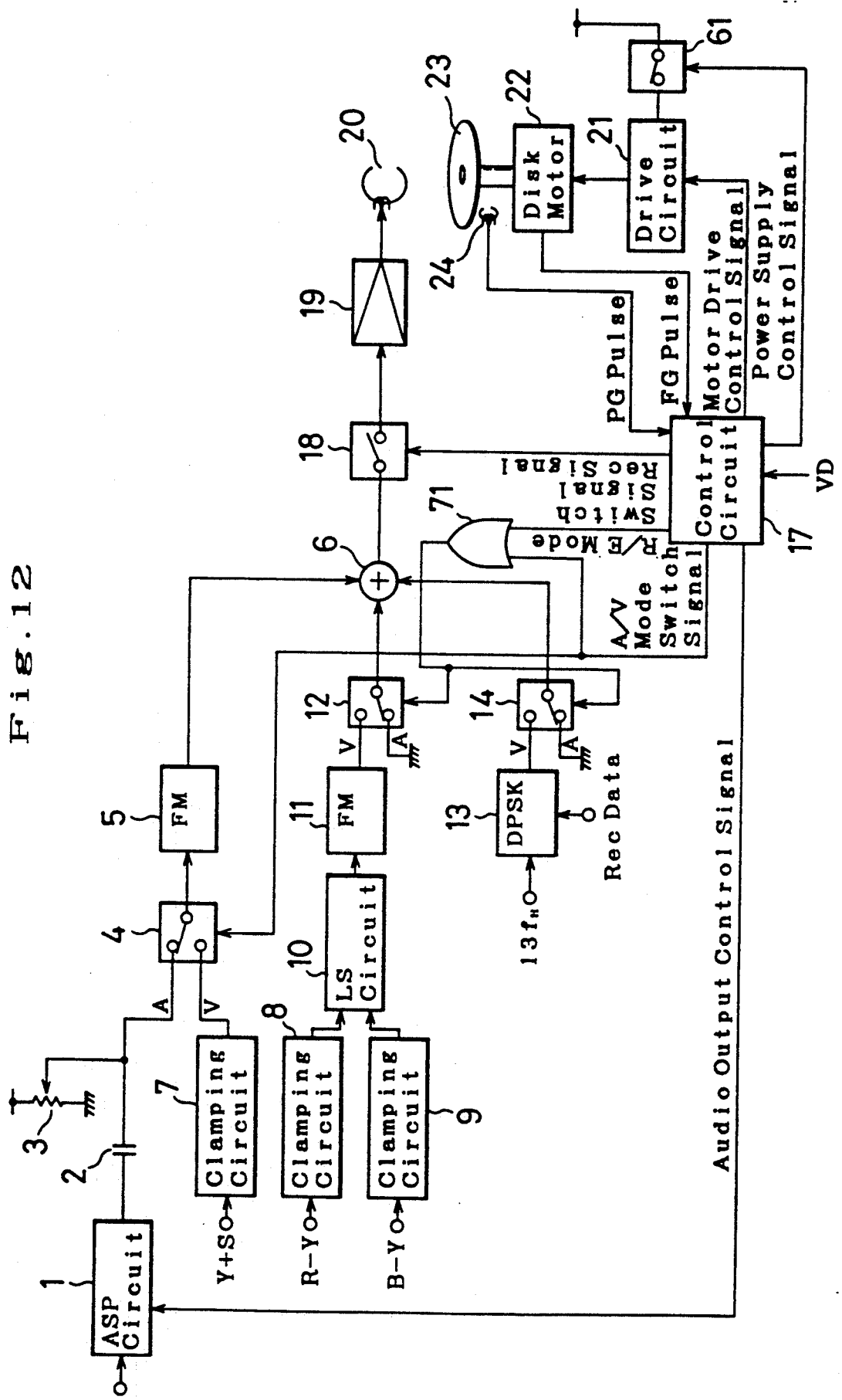
FIG. 12 is a circuit diagram of a third embodiment of an erasing device according to the present invention.

FIG. 12 shows a third embodiment of an erasing device according to the present invention.

In this embodiment, although the switch 4 is switched directly by a signal outputted from the control circuit 17, the switches 12 and 14 are switched in accordance with a signal outputted from the control circuit 17 through the OR gate 71. The remaining construction is the same as shown in FIG. 10.

In this embodiment, the control circuit 17 outputs a switching signal "H" when recording an audio signal, and outputs a switching signal "L" when recording a video signal. Switch 4 is switched to contact A when recording an audio signal and to contact V when recording a video signal, respectively. The control circuit 17 outputs a switching signal "L" in a recording mode, and outputs a switching signal "H" in the erasing mode, to one input terminal of an OR gate 71. The other input terminal of the OR gate 71 is supplied with a signal "H" when recording an audio signal, and with a signal "L" when recording a video signal, respectively. Therefore, the OR gate 71 outputs a signal "H" when recording an audio signal, and a signal "L" when recording a video signal, respectively, whereby the switches 12 and 14 are switched to contacts A when recording an audio signal and to contacts V when recording a video signal, respectively.

In the erasing mode, the control circuit 17 outputs a switching signal so that the switch 4 selects a video signal. As a result, the switch 4 is switched to the contact V. At this time, however, since an output signal of the OR gate 71 becomes "H", the switches 12 and 14 are switched to the contacts A.

Therefore, the luminance signal "Y+S" clamped by the clamping circuit 7 and inputted to the frequency-modulator 5 is frequency-modulated, and inputted to the adder 6. This luminance signal "Y+S" is supplied to the head 20 as an erasing signal, and recorded on the disk 23.

Figure 13:
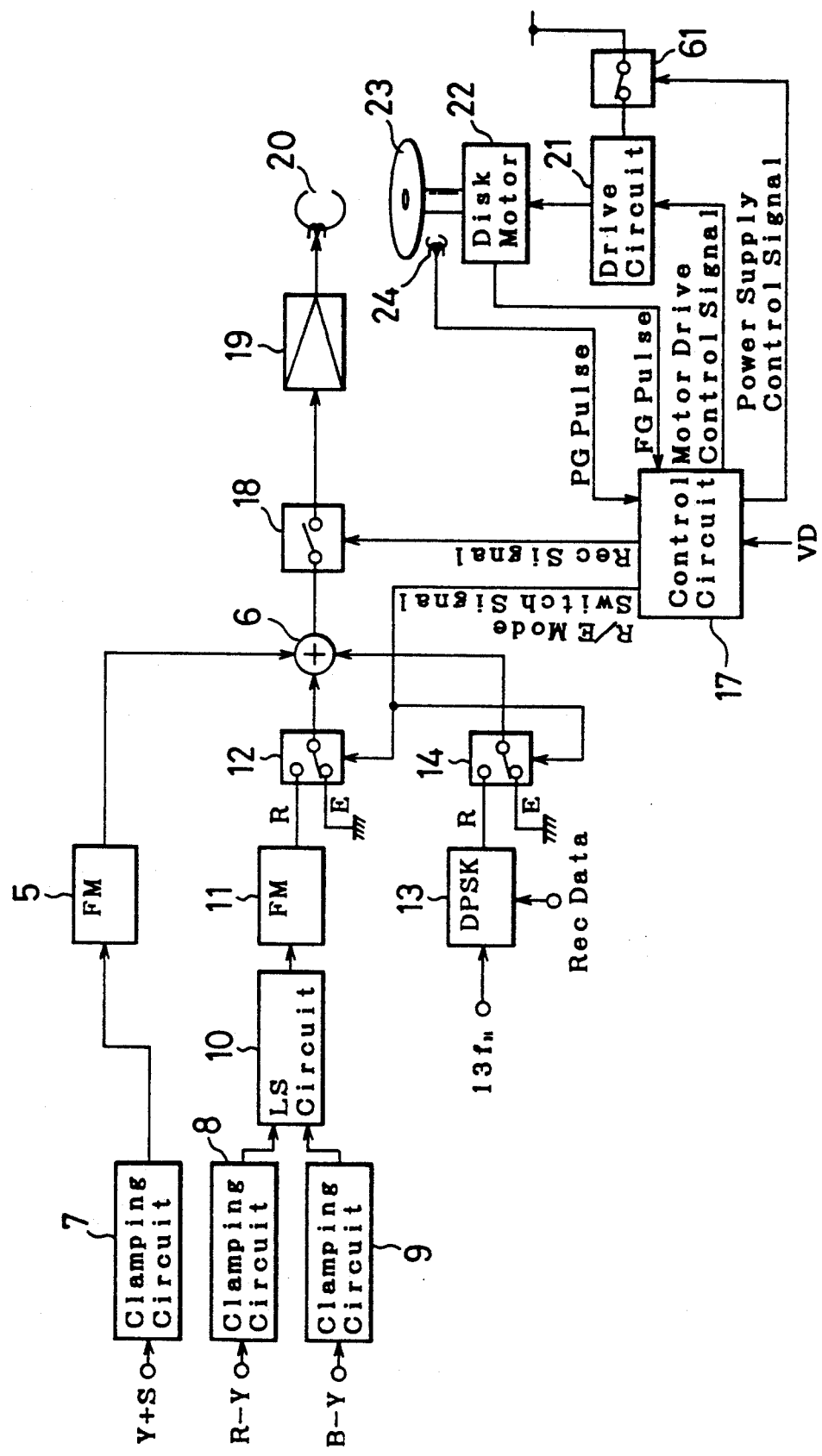
FIG. 13 is a circuit diagram of a fourth embodiment of an erasing device according to the present invention.

FIG. 13 shows a fourth embodiment of an erasing device according to the present invention.

In this embodiment, which is different from that of FIG. 12, the audio signal processing circuit 1, and therefore, the capacitor 2, the resistor 3 and the switch 4, which should be connected to the audio signal processing circuit 1, are not provided. Accordingly, the OR gate 71 provided in the embodiment shown in FIG. 12 is not provided in this fourth embodiment. An output signal of the clamping circuit 7 is directly inputted to the frequency-modulator 5. Switches 12 and 14 are switched to contacts E in the erasing mode and to contacts R in the recording mode, respectively. The remaining construction is the same as that shown in FIG. 12.

Accordingly, in this fourth embodiment, only video signals composed of the luminance signal "Y+S", the R−Y differential color signal, the B−Y differential color signal and the DPSK signal are recorded on the disk 23. Thus, in the erasing mode, the luminance signal "Y+S" is recorded on the disk 23 as an erasing signal.

Figure 14:
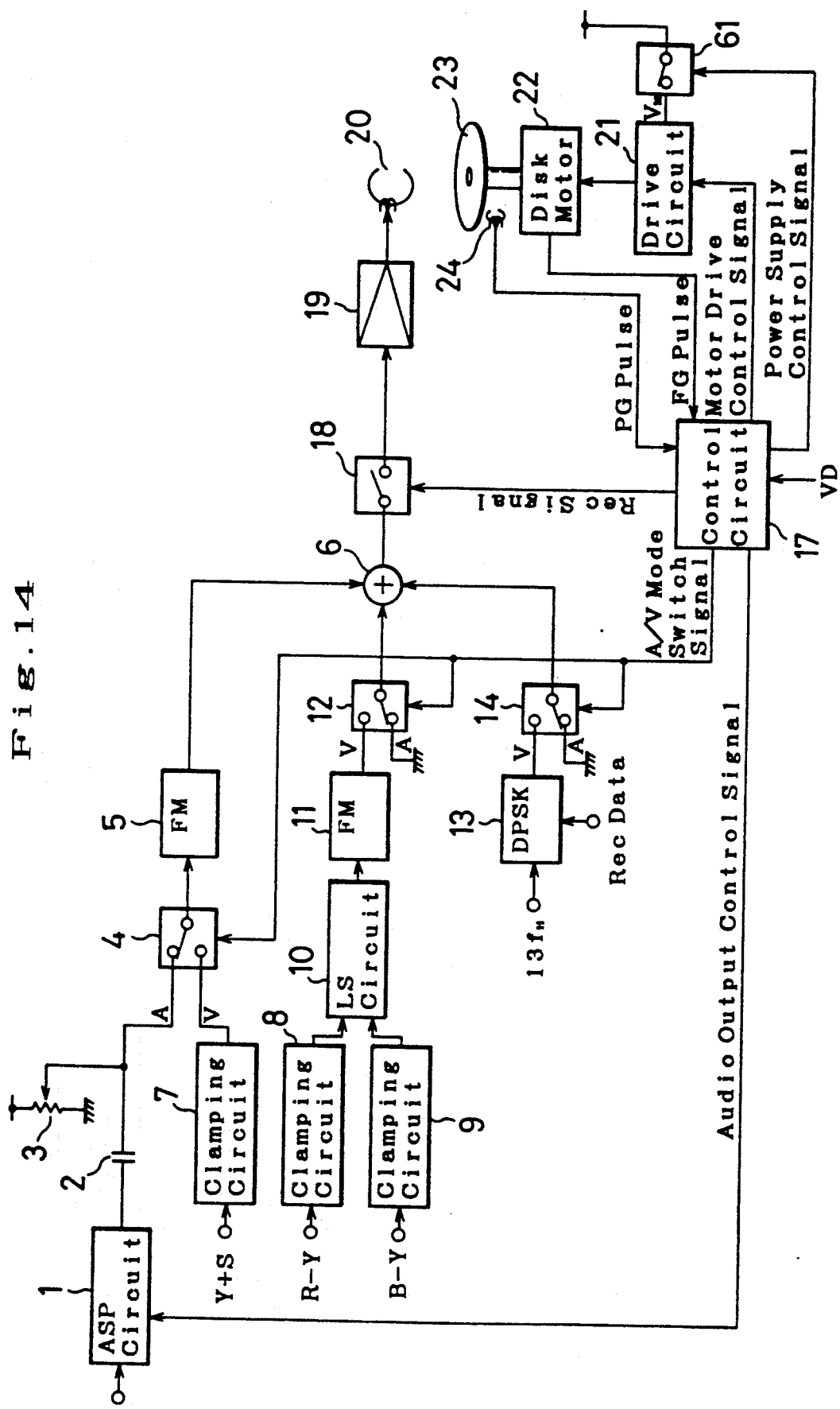
FIG. 14 is a circuit diagram of a fifth embodiment of an erasing device according to the present invention.

FIG. 14 shows a fifth embodiment of an erasing device according to the present invention.

In this embodiment, the construction is basically the same as that shown in FIG. 10, but in this construction, the switches 4, 12 and 14 are switched to contacts A when an audio signal is recorded and switched to contacts V when a video signal is recorded, respectively, and switched to contacts V in the erasing mode.

Therefore, a composite signal composed of the luminance signal "Y+S", the R−Y differential color signal, the B−Y differential color signal and the DPSK signal is recorded on the disk 23, as an erasing signal.

Figure 15:
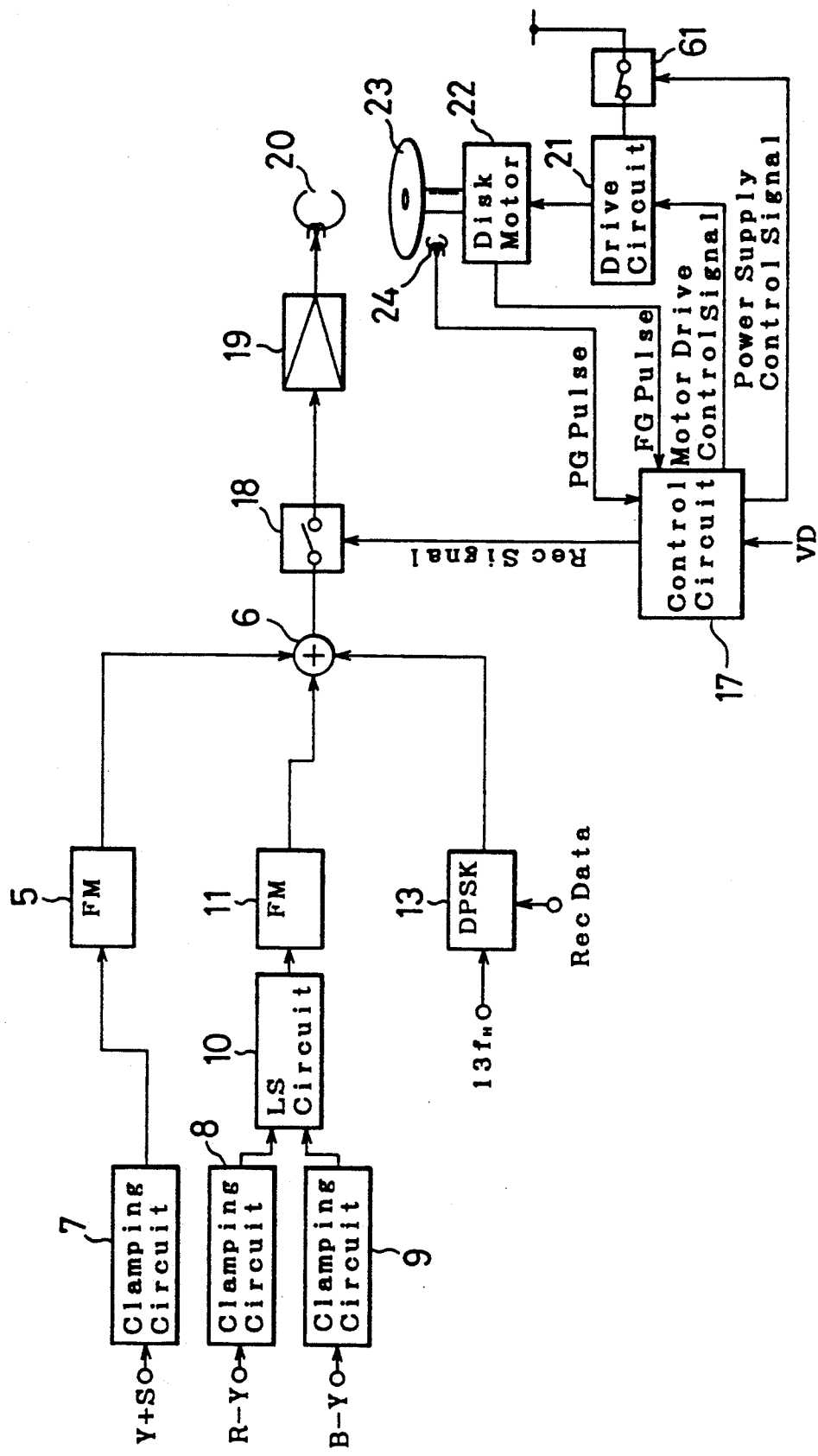
FIG. 15 is a circuit diagram of a sixth embodiment of an erasing device according to the present invention.

FIG. 15 shows a sixth embodiment of an erasing device according to the present invention.

In this embodiment, which is different from FIG. 14, the audio signal processing circuit 1, and therefore, the capacitor 2, the resistor 3 and switches 4, 12 and 14, which should be connected to the audio signal processing circuit 1, are not provided. An output signal of the clamping circuit 7 is directly inputted to the frequency-modulator 5, and signals from the frequency-modulator 11 and the DPSK-modulator 13 are outputted directly to the adder 6. The remaining construction is the same as that shown in FIG. 14.

In this sixth embodiment, only video signals composed of the luminance signal "Y+S", the R−Y differential color signal, B−Y differential color signal and the DPSK signal are recorded on the disk 23. In the erasing mode, a composite signal (video signal) composed of the luminance signal "Y+S", the R−Y differential color signal, the B−Y differential color signal and the DPSK signal, is recorded on the disk 23 as an erasing signal.

Figure 16:
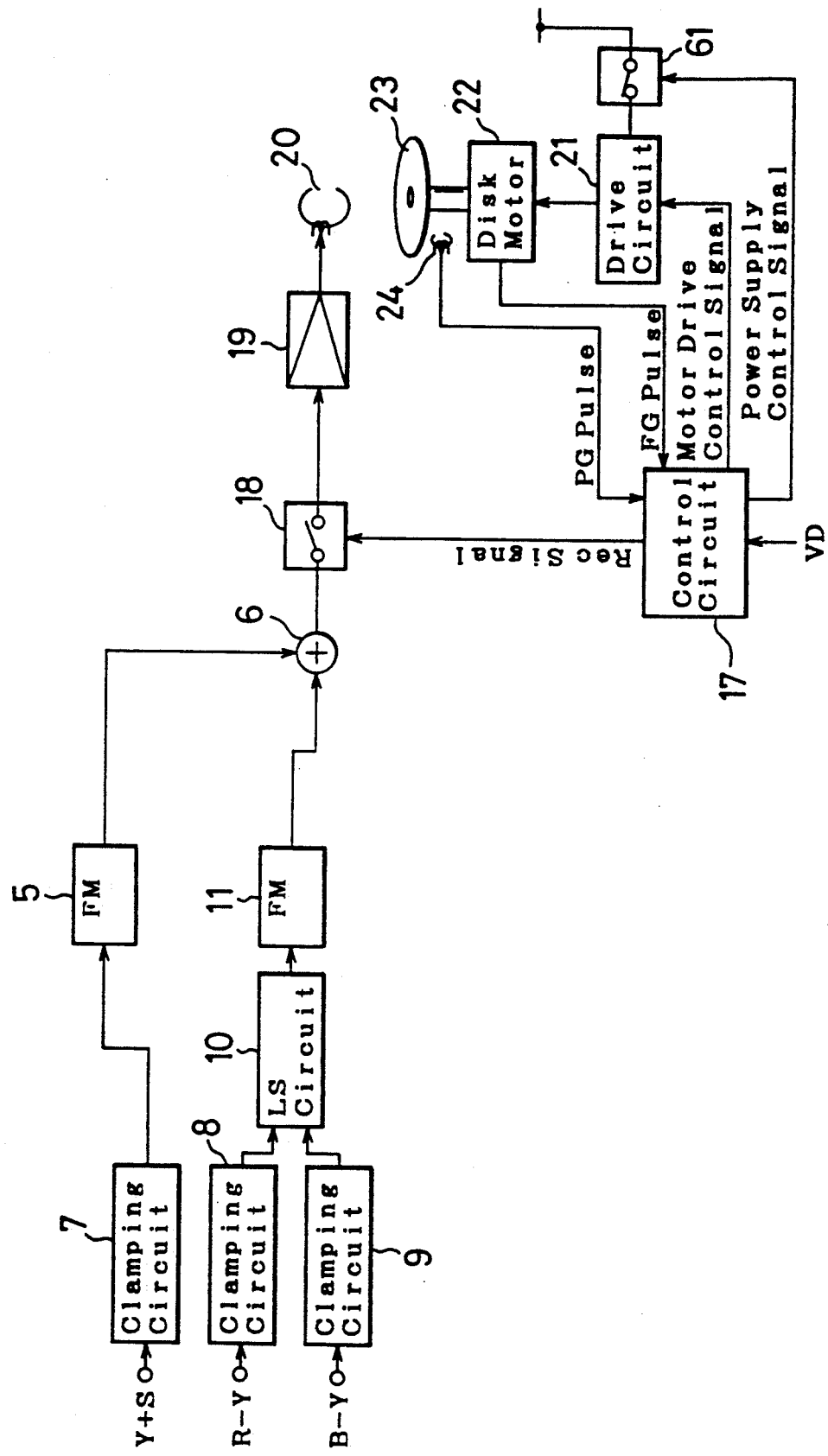
FIG. 16 is a circuit diagram of a seventh embodiment of an erasing device according to the present invention.

FIG. 16 shows a seventh embodiment of an erasing device according to the present invention.

In this embodiment, which is different from FIG. 15, the DPSK-modulator 13 is not provided. The remaining construction is the same as that shown in FIG. 16.

In this seventh embodiment, only video signals composed of the luminance signal "Y+S", the R−Y differential color signal and the B−Y differential color signal are recorded on the disk 23. In the erasing mode, a composite signal (video signal) composed of the luminance signal "Y+S", the R−Y differential color signal and the B−Y differential color signal, is recorded on the disk 23 as an erasing signal.

Figure 17:
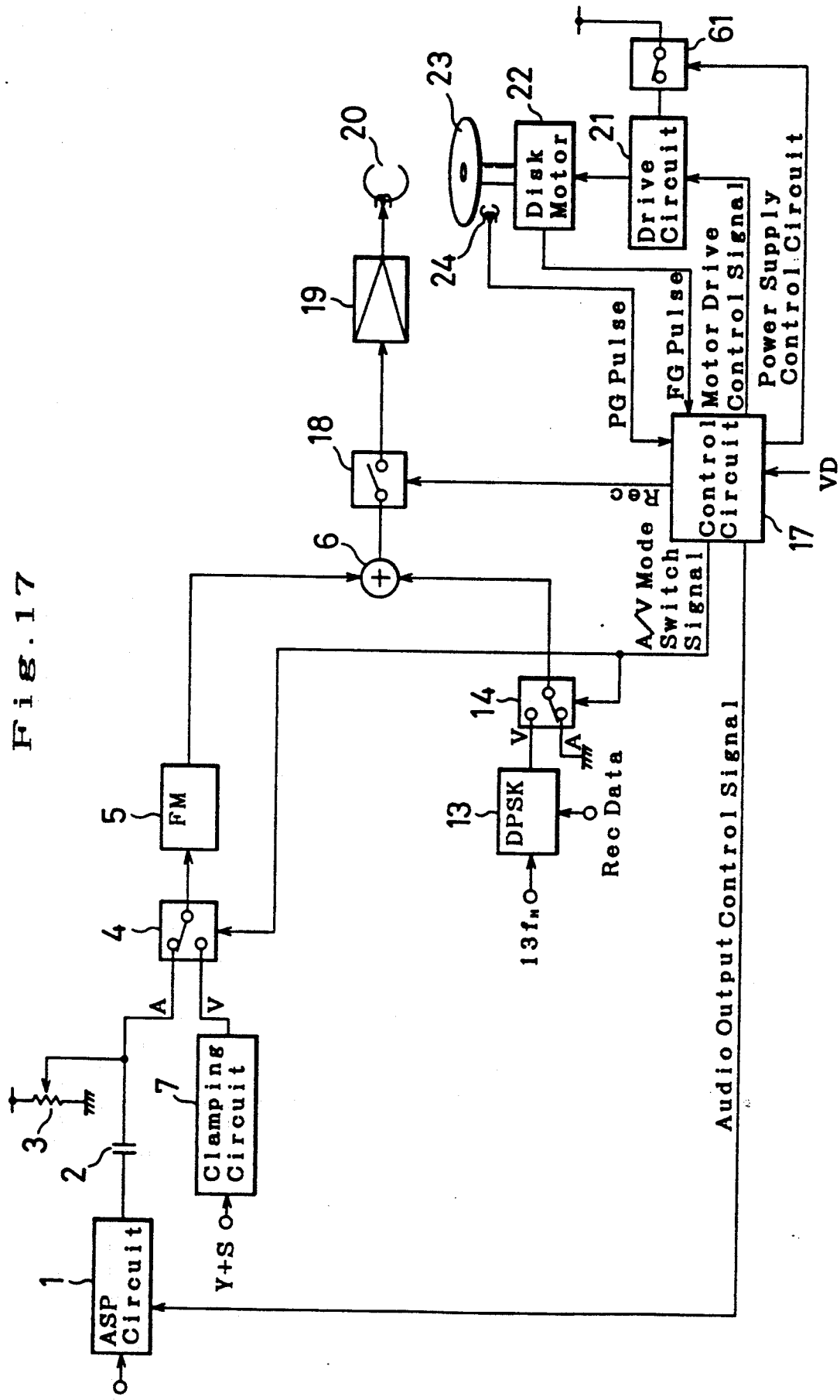
FIG. 17 is a circuit diagram of a eighth embodiment of an erasing device according to the present invention.

FIG. 17 shows an eighth embodiment of an erasing device according to the present invention.

In this embodiment, the clamping circuits 8 and 9, the line sequentializing circuit 10 and the frequency-modulator 11, which are provided in the embodiment shown in FIG. 14, are not provided. The remaining construction is the same as that shown in FIG. 14.

In this eighth embodiment, video signals composed of the luminance signal "Y+S" and the DPSK signal, or an audio signal are recorded onto the disk 23. In the erasing mode, a composite signal composed of the luminance signal "Y+S" and the DPSK signal is recorded on the disk 23, as an erasing signal.

Figure 18:
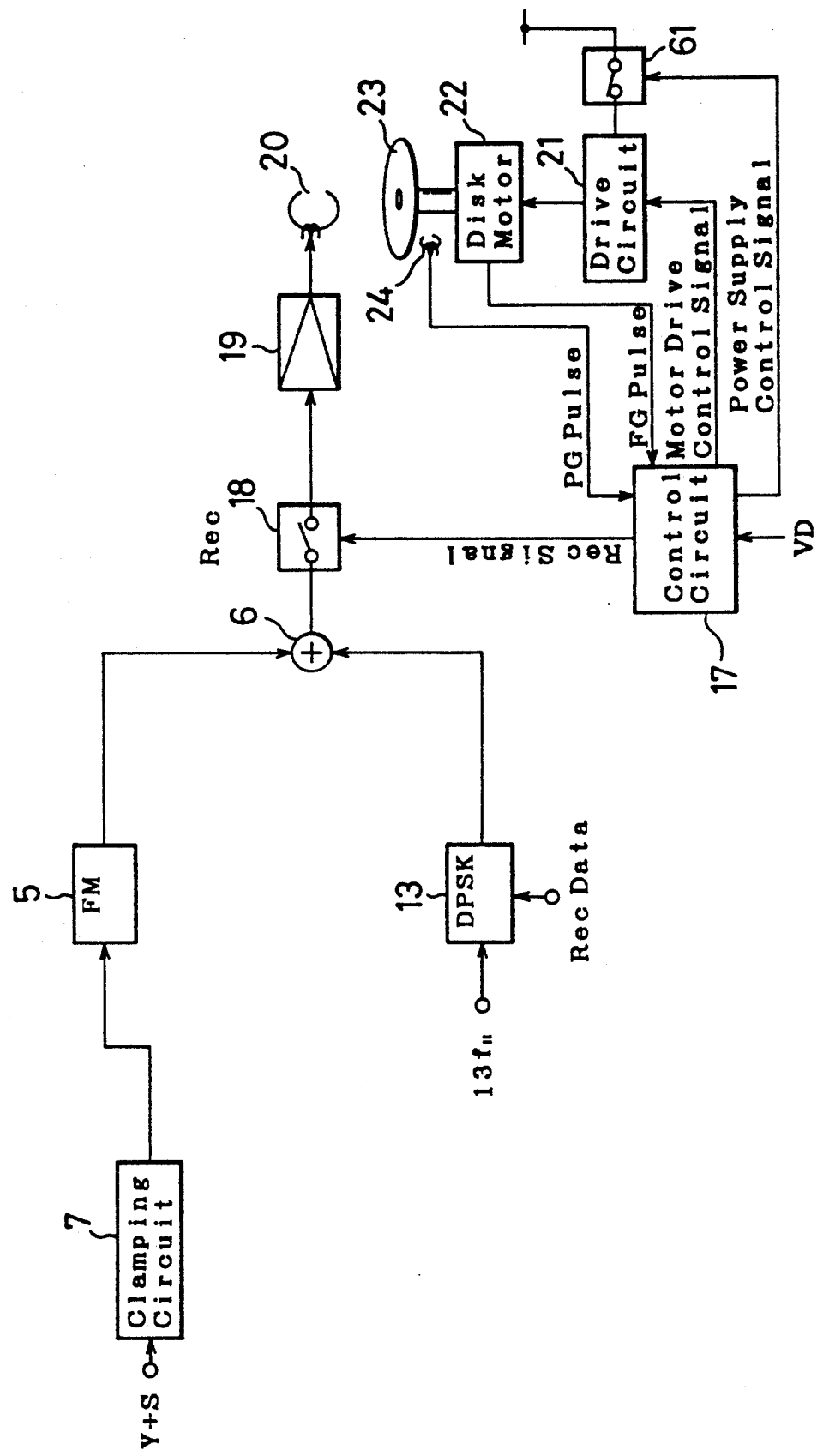
FIG. 18 is a circuit diagram of a ninth embodiment of an erasing device according to the present invention.

FIG. 18 shows a ninth embodiment of an erasing device according to the present invention.

In this embodiment, the audio signal processing circuit 1, and therefore, the capacitor 2, the resistor 3 and the switches 4 and 14 shown in FIG. 17, which should be connected to the audio signal processing circuit 1, are not provided. An output signal of the clamping circuit 7 is directly inputted to the frequency-modulator 5. Signals from the DPSK-modulator 13 are directly outputted to the adder 6. The remaining construction is the same as that shown in FIG. 17.

In this ninth embodiment, only video signals composed of the luminance signal "Y+S" and the DPSK signal are recorded on the disk 23. In the erasing mode, a composite signal (video signal) composed of the luminance signal "Y+S" and the DPSK signal, is recorded on the disk 23 as an erasing signal.

FIG. 19 shows a tenth embodiment of an erasing device according to the present invention.

The erasing device of this embodiment has a switch 15 provided between the adder 6 and the switch 18, and a generator or oscillator 16 which outputs an erasing signal having a predetermined frequency and is connected to the switch 15. The remaining construction is the same as that of the first embodiment shown in FIG. 1.

In the tenth embodiment, as in the above described embodiments, in the erasing mode, a rotation speed of the disk 23 is gradually lowered from the standard speed and finally stopped. During a period in which the rotation of the disk 23 is lowered and stopped, the erasing signal having a frequency "f" outputted by the generator 16 is recorded on the disk 23.

In each embodiment described above, the disk 23 is stopped after rotating by at least one revolution at a rotation speed, such that the minimum frequency of the erasing signal is located outside the FM record band.

When an audio FM carrier, a luminance FM carrier or a signal having a specific frequency "f" is used as an erasing signal, since the frequencies of these signals are relatively high, by stopping a supply of the voltage VM or the PWM signal to the motor drive circuit 21, the disk motor 22 is gradually decelerated by its own inertia and finally stopped, so that an erasing signal which reaches a frequency high enough to be located outside the FM record band at the standard speed can be recorded on the disk 23.

On the other hand, when the R−Y differential color signal, the B−Y differential color signal or the DPSK signal is used as an erasing signal, since the frequencies of these signals are relatively low, the rotation of the disk 23 is preferably relatively gradually lowered by controlling a pulse width of the PWM signal, for example, as shown in FIG. 5.

Therefore, instead of using the R−Y differential color FM signal, the B−Y differential color FM signal and the DPSK signal, use of the audio FM carrier or the luminance signal "Y+S" as the erasing signal can shorten a time needed to completely stop the disk 23.

Note, although in the above described embodiments an audio FM carrier, which is not frequency-modulated, is used as an erasing signal, the present invention is not restricted to such a construction, i.e., an audio frequency-modulated signal may be used as an erasing signal.

Further note, although in the above described embodiments the erasing signal is recorded on the disk 23 during a period in which the disk 23 is decelerated and finally stopped, as shown in FIG. 20, the erasing signal can be recorded on the disk 23 when a rotation speed of the disk 23 is changed to 1/n of the standard speed. Namely, in this embodiment, the disk 23 is not stopped when erasing a recording on the disk 23, but instead a rotation speed of the disk 23 is decreased to 1/n of the standard speed. The erasing signal may be recorded on the disk 23 not only when the rotation speed of the disk 23 is 1/n of the standard speed but also while the rotation speed is gradually reduced to 1/n of the standard speed.

Furthermore, although the switch 18 is provided between the adder 6 and the amplifier 19 in the above embodiments, the switch 18 may be provided between the adder 6 and the frequency-modulator or the DPSK-modulator, respectively.

Further, although the luminance signal "Y+S" included in the video signal is used as the erasing signal in the above embodiments, only one signal among the R−Y differential color signal, the B−Y differential color signal and the DPSK signal can be used as the erasing signal.

As described above, according to the erasing devices of the above embodiments, a signal having a relatively low frequency can be used as an erasing signal, for erasing signals recorded on the disk 23.

Further, according to the embodiments other than the tenth embodiment shown in FIG. 19, since the generator 16 is not provided, components for supplying an oscillation signal outputted by the generator 16 to the disk 23 are not required. Therefore, the construction thereof is simpler than that of the tenth embodiment.

Although the embodiments of the present invention have been described herein with reference to the accompanying drawings, obviously many modifications and changes may be made by those skilled in this art without departing from the scope of the invention.

The present disclosure relates to subject matters contained in Japanese patent applications No. HEI 2-98537 (filed on Apr. 13, 1990), No. HEI 2-102617, No. HEI 2-102618, No. HEI 2-102619, No. HEI 2-102620, and No. HEI 2-102621 (filed on Apr. 17, 1990), which are expressly incorporated herein by reference in their entirety.

We claim:

1. A device for erasing a signal recorded on a recording medium, said erasing device comprising:
   means for rotating said recording medium;
   means for recording at least one signal on said recording medium;
   means for generating an erasing signal;
   means for supplying said erasing signal to said recording means for erasing said signal recorded on said recording medium; and
   means for controlling said rotating means and said supplying means to erase said signal recorded on said recording medium, said controlling means controlling said rotating means to gradually reduce a rotation speed of said recording medium to a predetermined speed, and controlling said supplying means to record said erasing signal on said recording medium while said rotation speed of said recording medium is gradually reduced, wherein said erasing signal comprises at least a component of said at least one signal recorded on said recording medium.

2. An erasing device according to claim 1, wherein said predetermined speed to which said rotation speed is reduced is zero.

3. An erasing device according to claim 1, wherein said controlling means controls said supplying means to record said erasing signal on said recording medium when said recording medium is rotated at said predetermined speed which does not reach zero.

4. An erasing device according to claim 1, wherein said controlling means outputs a pulse signal having a predetermined width, to thereby control said rotation speed of said recording medium, and gradually decrease said width of said pulse signal to gradually reduce said rotation speed of said recording medium when erasing said signal recorded on said recording medium.

5. An erasing device according to claim 1, wherein said controlling means outputs a pulse signal having a predetermined width to control said rotation speed of said recording medium, said controlling means stopping said pulse signal to gradually reduce said rotation speed of said recording medium when erasing said at least one signal recorded on said record medium.

6. An erasing device according to claim 1, wherein said recording means records an audio signal on said recording medium, and said erasing signal includes said audio signal.

7. An erasing device according to claim 6, further comprising means for frequency-modulating said audio signal, said recording means recording said frequency-modulated audio signal on said recording medium, and said frequency-modulating means outputting said erasing signal.

8. An erasing device according to claim 6, wherein said recording means further records a luminance signal, a color difference signal and a code signal on said recording medium.

9. An erasing device according to claim 8, further comprising means for frequency-modulating said luminance signal and said color difference signal, and means for DPSK-modulating said code signal.

10. An erasing device according to claim 1, wherein said recording means records a video signal including at least one of a luminance signal, a color difference signal and a code signal, and said erasing signal includes at least one of said luminance signal, said color difference signal and said code signal.

11. An erasing device according to claim 1, wherein said recording means records a luminance signal on said recording medium, and said erasing signal includes said luminance signal.

12. An erasing device according to claim 11, further comprising means for frequency-modulating said luminance signal, said recording means recording said frequency-modulated luminance signal on said recording medium, and said frequency-modulating means outputting said erasing signal.

13. An erasing device according to claim 11, wherein said recording means further records a color difference signal and a code signal on said recording medium.

14. An erasing device according to claim 13, further comprising means for frequency-modulating said color difference signal, and means for DPSK-modulating said code signal.

15. An erasing device according to claim 1, wherein said recording means records a luminance signal and a color difference signal on said recording medium, and said erasing signal includes said luminance signal and said color difference signal.

16. An erasing device according to claim 1, further comprising means for frequency-modulating a luminance signal and a color difference signal, said recording means recording said frequency-modulated luminance signal and said frequency-modulated color difference signal on said recording medium, and said frequency-modulating means outputting said erasing signal.

17. An erasing device according to claim 1, wherein said recording means records a luminance signal, a color difference signal and a code signal on said recording medium, and said erasing signal includes said luminance signal, said color difference signal and said code signal.

18. An erasing device according to claim 17, further comprising means for frequency-modulating said luminance signal and said color difference signal, and means for DPSK-modulating said code signal, said recording means recording said DPSK-modulated code signal on said recording medium, and said frequency-modulating means and said DPSK-modulating means outputting said erasing signal.

19. An erasing device according to claim 17, wherein said recording means further records an audio signal on said recording medium.

20. An erasing device according to claim 19, for comprising means for frequency-modulating said audio signal.

21. An erasing device according to claim 1, wherein said recording means records a luminance signal and a code signal on said recording medium, and said erasing signal includes said luminance signal and said code signal.

22. An erasing device according to claim 21, further comprising means for frequency-modulating said luminance signal, and means for DPSK-modulating said code signal, said recording means recording said frequency-modulated luminance signal and said DPSK-modulated code signal on said recording medium, and said frequency-modulating means and said DPSK-modulating means outputting said erasing signal.

23. An erasing device according to claim 21, wherein said recording means further records an audio signal on said recording medium.

24. An erasing device according to claim 23, further comprising means for frequency-modulating said audio signal.

25. An erasing device according to claim 1, wherein said generating means comprises a generator that outputs a signal having a predetermined frequency.

26. A device for erasing a signal recorded on a recording medium, said erasing device comprising:
   means for rotating said recording medium;
   means for generating an erasing signal;
   means for supplying said erasing signal to said recording medium for erasing said signal on said recording medium; and
   means for controlling said rotating means and said supply means to erase said signal recorded on said recording medium, said controlling means controlling said rotating means to gradually reduce a rotational speed of said recording medium to a predetermined speed, and controlling said supplying means to record said erasing signal on said recording medium while said rotational speed of said recording medium is gradually reduced, wherein said erasing signal comprises at least one component of a signal that is recorded on said recording medium.

27. A device for erasing a signal recorded on a recording medium, said erasing device comprising:
   means for rotating said recording medium;
   means for outputting an erasing signal to said recording medium when erasing said signal on said recording medium; and
   means for controlling said rotating means and said recording medium when erasing said signal recorded on said recording medium, said controlling means controlling said rotating means to gradually reduce a rotational speed of said recording medium to stop said rotation of said recording medium, and controlling said outputting means to record said erasing signal on said recording medium at least during a period in which said recording medium is gradually decelerated, wherein said erasing signal comprises at least one component of a signal that is recorded on said recording medium.

28. A device for erasing a signal recorded on a recording medium mounted in a recording device, in which said signal is recorded on said recording medium during a rotation of said recording medium, said erasing device comprising:
   means for rotating said recording medium at a predetermined rotational speed that is slower than a rotation speed used when recording said signal on said recording medium; and
   means for erasing said signal recorded on said recording medium, said erasing means recording an erasing signal on said recording medium while said rotating means rotates said recording medium at said predetermined rotational speed, whereby said signal recorded on said recording medium is erased, said erasing signal corresponding to information inputted from outside of said recording device, wherein said erasing signal comprises at least one component of said signal that is recorded on said recording medium.

29. A device according to claim 28, wherein said recording device records at least one of a video signal and an audio signal, and said information comprises at least one of said video signal and said audio signal.

30. A device for erasing a signal recorded on a recording medium rotated by a rotational mechanism, said device including an erasing mechanism outputting an erasing signal to said recording medium when erasing said signal recorded on said recording medium, said device being characterized in that;

said rotational mechanism gradually reduces a rotation speed of said recording medium to a predetermined speed, and said erasing mechanism outputs said erasing signal to said recording medium at least during a period in which said rotation speed of said recording medium is gradually reduced, said erasing signal comprising at least one component of a signal recorded on said recording medium.

31. A device according to claim 30, wherein said predetermined speed to which said rotation speed is reduced is zero.

32. A device according to claim 30, wherein said erasing mechanism outputs said erasing signal to said recording medium after said rotation speed of said recording medium has reached said predetermined speed which does not reach zero.

33. A device according to claim 30, wherein said rotation mechanism outputs a pulse signal having a predetermined width, to thereby control said rotation speed of said recording medium, and gradually decreases said width of said pulse signal to gradually reduce said rotation speed of said recording medium when erasing said signal recorded on said recording medium.

34. A device according to claim 30, wherein said rotation mechanism outputs a pulse signal having a predetermined width to control said rotation speed of said record medium, said rotation mechanism stopping said pulse signal to gradually reduce said rotation speed of said recording medium when erasing said signal recorded on said recording medium.

35. An erasing device according to claim 30, wherein means for recording records a video signal including at least one of a luminance signal, a color difference signal and a code signal, and said erasing signal includes at least one of said luminance signal, said color difference and said code signal.

36. A device according to claim 30, wherein said erasing mechanism outputs an audio signal as said erasing signal.

37. A device according to claim 30, wherein said erasing mechanism outputs a luminance signal as said erasing signal.

38. A device according to claim 30, wherein said erasing mechanism outputs a luminance signal and a color difference signal as said erasing signal.

39. A device according to claim 30, wherein said erasing mechanism outputs a luminance signal, a color difference signal and a code signal as said erasing signal.

40. A device according to claim 30, wherein said erasing mechanism outputs a luminance signal and a code signal as said erasing signal.

41. A device according to claim 30, wherein said erasing mechanism has a generator that outputs a signal having a predetermined frequency.

* * * * *